March 7, 1961 W. KES ET AL 2,974,183
GASKET FOR ELECTRIC EQUIPMENT
Original Filed April 21, 1954

United States Patent Office 2,974,183
Patented Mar. 7, 1961

2,974,183

GASKET FOR ELECTRIC EQUIPMENT

William Kes, Bethpage, and Jasper J. Okrent, Flushing, N.Y., assignors to Hazeltine Research, Inc., Chicago, Ill., a corporation of Illinois Continuation of application Ser. No. 424,565, Apr. 21, 1954. This application Apr. 8, 1959, Ser. No. 805,093

4 Claims. (Cl. 174—35)

This invention relates to a gasket for electric equipment suitable as a moisture seal and electric seal between edges of a hollow shield for electric equipment.

This application is a continuation of application Serial No. 424,565, filed April 21, 1954, now abandoned.

It has heretofore been extremely difficult to provide a satisfactory electric seal and moisture seal between edges of the housing of, for example, radar equipment capable of shielding the internal electric circuits of the equipment from external electric fields and capable of preventing damage to the circuits due to moisture leakage.

It is an object of the invention, therefore, to provide a gasket of the type described which is capable of providing a suitable electric or moisture seal or both.

In accordance with the invention, a sealed joint in an electrical shield which completely encloses and thereby electrically shields electric equipment against electric fields comprises juxtaposed edges in the shield forming a line of closure therein and a flat gasket strip of resilient material between the edges. The invention also includes a length of metal braid permanently affixed to the gasket strip along an edge thereof in electrical contact with the edges of the shield along the line of closure.

For a better understanding of the present invention, together wtih other and further objects thereof, reference is had to the following description taken in connection with the accompanying drawing, and its scope will be pointed out in the appended claims.

Referring to the drawing.

Figure 1:
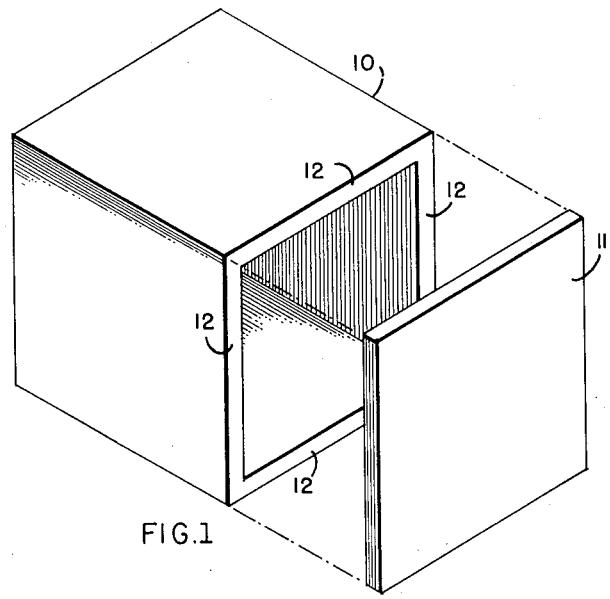
Fig. 1 is an illustration of a housing or shield for electric equipment such as radar equipment.
Figure 2A:
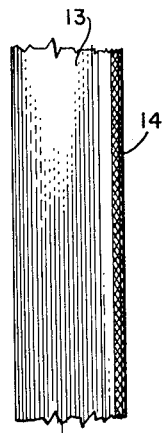
Fig. 2a is a top view of a gasket constructed in accordance with the invention.
Figure 2B:
Fig. 2b is a cross section of the Fig. 2a gasket.

Referring now to Fig. 1, an electrical shield 10 there represented for completely enclosing and thereby electrically shielding electric equipment against electric fields has a removable cover 11 which may be affixed by any suitable means (not shown) to edges 12, 12, 12, 12 of the shield 10 to shield the electric equipment. The juxtaposed edges of the shield 10 and its cover 11 form a line of closure along which there may be disposed a flat gasket strip 13 of resilient material of, for example, rubber, represented in Figs. 2a and 2b. A compressible metal tape 14 preferably comprising compressible rolled metal braid is imbedded in and supported by the rubber strip 13 along an edge thereof by any suitable means, such as vulcanizing or molding or by splitting the edge of the rubber strip and cementing the tape within the rubber strip between the split faces thereof.

Figure 3:
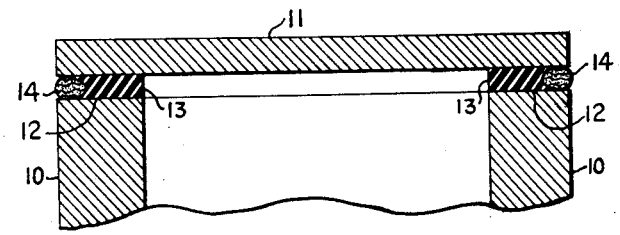
Fig. 3 is a cross section showing the positioning of the Fig. 2b gasket in the Fig. 1 shield.

Fig. 3 shows how the gasket constructed in accordance with the present invention may be positioned between the shield 10 and its cover 11.

The braid 14 is so imbedded in the gasket that the main body of the braid is in electrical contact with the shield along the line of closure to bar electric fields from the space therein. Accordingly, the rubber strip acts as a moisture seal while the metal braid acts as an electric seal. Because of the edgewise relation between the rubber strip and the metal braid, both may be firmly clamped between the juxtaposed edges of the shield 10, 11 of Fig. 1 to form a unitary effective electric and moisture seal.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A sealed joint in an electrical shield which completely encloses and thereby electrically shields electric equipment against electric fields comprising: juxtaposed edges in the shield forming a line of closure therein; a flat gasket strip of resilient material between the edges; and a length of metal braid permanently affixed to the gasket strip along an edge thereof in electrical contact with the edges of the shield along the line of closure.

2. A sealed joint in an electrical shield which completely encloses and thereby electrically shields electric equipment against electric fields and moisture leakage comprising: juxtaposed edges in the shield forming a line of closure therein; a flat gasket strip of resilient material between the edges for preventing moisture leakage; and a length of metal braid imbedded in the gasket along an edge thereof in electrical contact with the edges of the shield along the line of closure to bar external electric fields from the space between them.

3. A gasket for electrically shielding electric equipment comprising: a flat strip of supporting material having a length of rolled metal braid permanently affixed along an edge thereof for electrically shielding said electric equipment.

4. A gasket for electrically shielding and moisture-sealing electric equipment comprising: an elongated flat strip of rubber-like material for moisture-sealing said electric equipment having roller metal braid imbedded therein along an edge thereof for electrically shielding said electric equipment.

References Cited in the file of this patent

UNITED STATES PATENTS

| | | |
|---|---|---|
| 741,808 | Miner | Oct. 20, 1903 |
| 2,454,567 | Pierson, Jr. | Nov. 23, 1948 |
| 2,783,295 | Ewing | Feb. 26, 1957 |

FOREIGN PATENTS

| | | |
|---|---|---|
| 487,463 | Great Britain | June 21, 1938 |

OTHER REFERENCES

Hall: Abstract of application Serial Number 616,923, published March 18, 1952, 656 O.G. 884.